United States Patent
Aoyama et al.

[11] Patent Number: 6,020,736
[45] Date of Patent: Feb. 1, 2000

[54] MAGNETORESISTIVE TYPE POSITION SENSOR HAVING BIAS MAGNETIC AND MAGNET RESISTANCE ELEMENTS IN BIAS MAGNETIC FIELD THEREOF

[75] Inventors: Seiki Aoyama, Toyohashi; Yasuaki Makino, Okazaki; Susumu Kuroyanagi, Anjo; Izuru Shoji, Nishio; Ichiro Izawa, Anjo, all of Japan

[73] Assignee: Nippondenso Co., Ltd., Kariya, Japan

[21] Appl. No.: 08/511,621

[22] Filed: Aug. 7, 1995

[30] Foreign Application Priority Data

Aug. 25, 1994 [JP] Japan .................................. 6-201110
Jun. 7, 1995 [JP] Japan .................................. 7-140873

[51] Int. Cl.[7] .............................. G01B 7/30; G01P 3/488; G01D 5/245; H01L 43/08
[52] U.S. Cl. .............................. 324/207.21; 324/207.22; 324/207.25
[58] Field of Search .......................... 324/207.2, 207.21, 324/207.25, 174, 207.22; 338/32 R, 32 H; 341/15

[56] References Cited

U.S. PATENT DOCUMENTS

| | | | |
|---|---|---|---|
| 3,934,160 | 1/1976 | Von Borcke | 324/207.21 |
| 4,086,533 | 4/1978 | Richouard et al. | 324/207.2 |
| 4,791,365 | 12/1988 | Johannes et al. | 324/207.25 |
| 4,875,008 | 10/1989 | Lorenzen | 324/207.25 |
| 5,359,287 | 10/1994 | Watanabe et al. | |
| 5,444,370 | 8/1995 | Wu | 324/207.2 |
| 5,754,042 | 5/1998 | Schroeder et al. | 324/207.25 |

FOREIGN PATENT DOCUMENTS 63-205515 8/1988 Japan .

*Primary Examiner*—Walter E. Snow
*Attorney, Agent, or Firm*—Pillsbury Madison & Sutro, LLP

[57] ABSTRACT

A rotation object is made of a magnetic material and disposed within a predetermined range of an angle of rotation on a plane perpendicular to an axis of rotation. A bias magnet generates a bias magnetic field to the rotation body in a direction perpendicular to the axis of rotation. Magnetic resistance elements are disposed in the bias magnetic field on a plane including the axis of rotation at a position deviated from the position of the rotation object in the axial direction of the rotation body and inclined by about 45° relative to a direction perpendicular to the axis of rotation.

44 Claims, 16 Drawing Sheets

MAGNETORESISTIVE TYPE POSITION SENSOR HAVING BIAS MAGNETIC AND MAGNET RESISTANCE ELEMENTS IN BIAS MAGNETIC FIELD THEREOF

CROSS REFERENCE TO RELATED APPLICATIONS

This application is based on claims priorities of the Japanese Patent Applications No. 6-201110 filed on Aug. 25, 1994 and No. 7-140873 filed on Jun. 7, 1995, the contents of which are incorporated herein by reference.

BACKGROUND OF THE INVENTION

1. Field of the Invention

The present invention concerns a position sensor and, more specifically, it relates to a position sensor using a magnetic resistance element or magnetoresistive element.

2. Description of Related Art

A gear-access type rotary sensor utilizing a magnetic resistance element has been disclosed in Japanese Patent Application Laid-Open No. Hei 3-195970. In the sensor, as shown in FIG. 24, a magnetic resistance element 32 is vapor deposited on a substrate 31. The substrate 31 is attached vertically to a magnetized side 33a of a bias magnet 33. The substrate 31 (magnetic resistance element 32) is opposed to a gear 34 comprising a magnetic body, and a bias magnetic field is generated from the bias magnet 33 to the gear 34. Then, change of the bias magnetic field (change of the direction of a magnetic vector B) is detected as a change of resistance along with the rotation of the gear 34. That is, the direction of the magnetic vector B changes at every passage of a tooth 34a of the gear 34 in front of the substrate 31 (magnetic resistance element 32), and it is taken out as an electric signal (sinusoidal signal or rectangular signal).

The rotary sensor can not detect the rotational position during stopping of rotation. That is, although the sensor always detects the angle of rotation during rotation of the gear 34, it can not detect the rotational position (angle of rotation) during stopping of rotation.

As a result, if the rotary sensor is used as a cylinder discriminating sensor in an ignition timing control system for a multi-cylinder gasoline engine it brings about a disadvantage. That is, as shown in FIG. 25, a cylinder discriminating sensor is disposed near a crank shaft or a cam shaft, a gear having protrusions (teeth) is disposed at a predetermined angle to the shaft, and cylinder discrimination signals G1 and G2 are outputted at every predetermined angles (predetermined crank angles). However, the angle of rotation can not be recognized during stopping of the shaft and a cylinder can be determined only when the tooth of the gear passes after starting the rotation of the gear of the engine. Accordingly, ignition timing controlled by the discrimination of the cylinder is retarded, and ignition delay occurs in a first cylinder and a second cylinder in FIG. 25 to cause a problem that unburnt gasoline stagnated in the cylinders is discharged. In FIG. 25, the cylinder discriminating signal just after the start of the engine is canceled (masked) for preventing erroneous detection due to lowering of a battery voltage caused by driving of a starter motor.

As described above, since the conventional rotational angle sensor detects the change of direction of the magnetic vector along with the rotation of the gear, the rotational position in a stationary state can not be detected and ignition delay is caused upon starting or cranking the engine, for example, when it is used as a cylinder discriminating sensor in an ignition timing control system of the multi-cylinder gasoline engine. Thus, sensors capable of discriminating the cylinder even during stopping of the engine has been demanded.

SUMMARY OF THE INVENTION

It is, accordingly, an object of the present invention to provide a position sensor capable of easily detecting a rotational position even in a stationary state of a body of rotation.

In accordance with a first aspect of the present invention, magnetic resistance elements are disposed in a bias magnetic field on a plane perpendicular to an axis of a body of rotation at the position deviated from the position for disposing the object to be detected in the axial direction of the body of rotation. Then, the direction of the magnetic vector of the bias magnetic field is detected by the magnetic resistance elements. Since the object to be detected is disposed within the predetermined range of the angle of rotation on the plane perpendicular to the axis of the body of rotation, when the magnetic vector directs to the object to be detected, this is detected by the magnetic resistance elements. That is, the magnetic vector deflects in the direction parallel with the axis of the body of rotation depending on the angle of rotation. This is detected by the magnetic resistance elements. Accordingly, even when the body of rotation is in a stationary state, it is detected to be within the predetermined range of the angle of rotation.

In accordance with a second aspect of the present invention, magnetic resistance elements are disposed in a bias magnetic field at a position deviated from the position of disposing the object to be detected in a radial direction of the body of rotation. The direction of a magnetic vector of the bias magnetic field is detected by the magnetic resistance elements. Since the object to be detected is disposed within the predetermined range of the angle of rotation on the plane perpendicular to the axis of the body of rotation, when the magnetic vector directs to the object to be detected, this is detected by the magnetic resistor elements. That is, the magnetic vector deflects in the radial direction of the body of rotation depending on the angle of rotation, and this is detected by the magnetic resistance elements. Accordingly, even when the body of rotation is in a stationary state, it is detected to be within the predetermined range of angle of rotation.

Preferably, in the first and the second aspects of the present invention, one-half angle in 360° of one rotation is detected by a semi-circular tooth.

More preferably, two semi-circular teeth are disposed. The direction of the magnetic vector changes at every one-half angle in 360° for one rotation. This is detected by the magnetic resistance elements. Accordingly, the deflecting angle of the magnetic vector is increased as compared with the case of using only one semi-circular tooth.

Still more preferably, the magnetic resistance elements are inclined by 45°.

BRIEF DESCRIPTION OF THE ACCOMPANYING DRAWINGS

DETAILED DESCRIPTION OF THE PREFERRED EMBODIMENTS

First Embodiment

A first embodiment of the present invention will be described with reference to the accompanying drawings.

Figure 1:
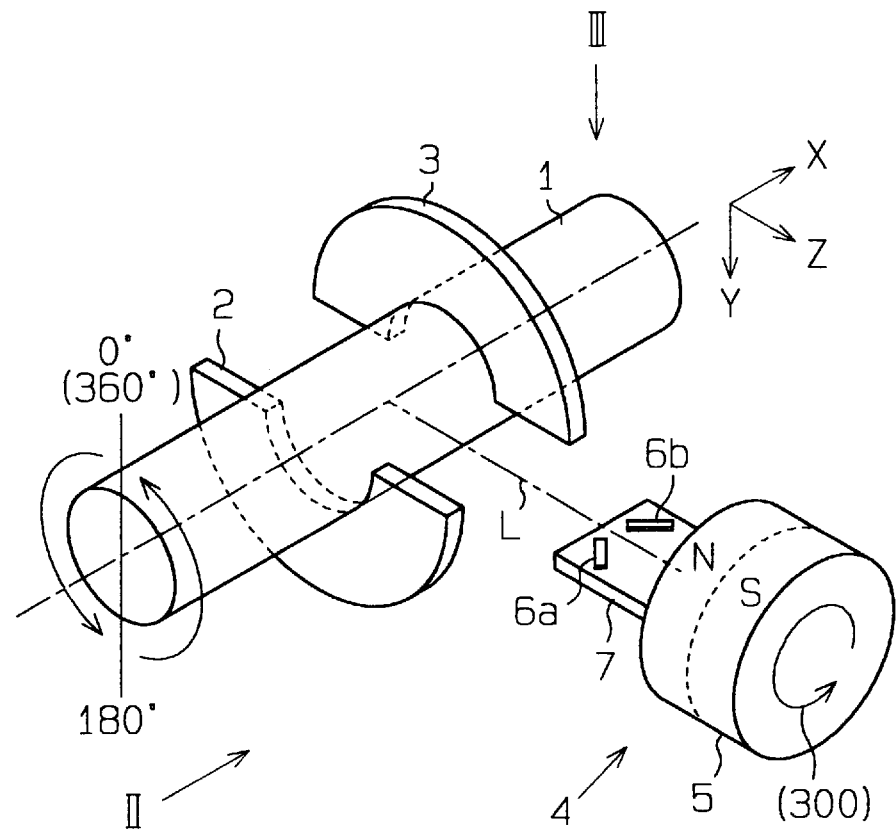
FIG. 1 is a perspective view of a rotational position sensor in a first embodiment according to the present invention.
Figure 2:
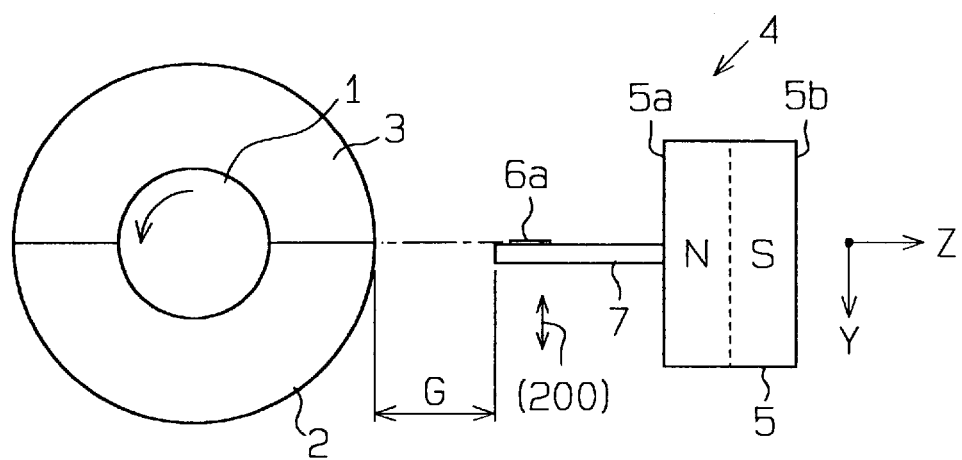
FIG. 2 is a side view observed along an arrow II in FIG. 1.
Figure 3:
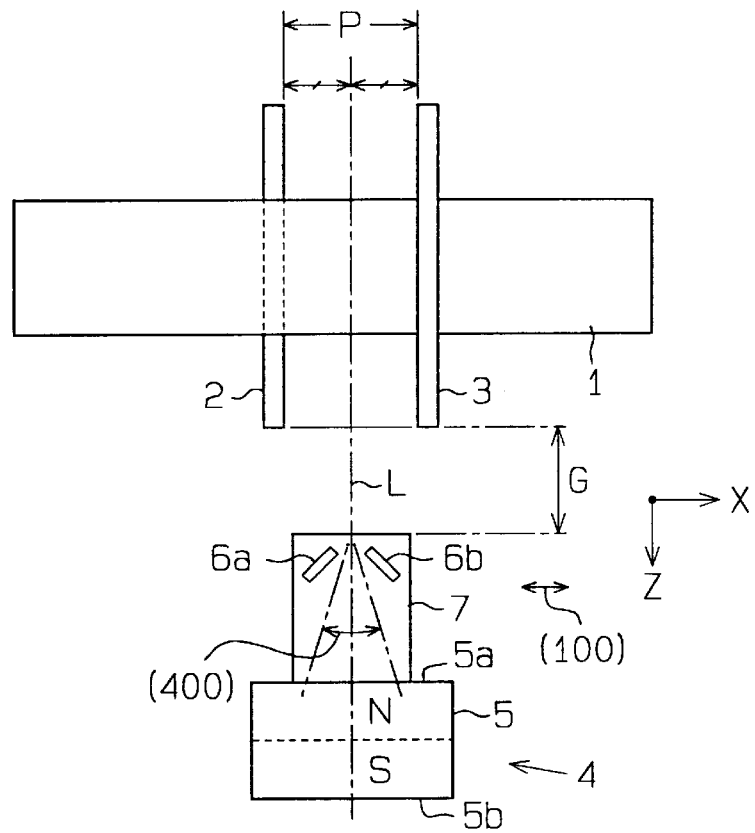
FIG. 3 is a plan view observed along an arrow III in FIG. 1.

FIG. 1 is a perspective view of a rotational position sensor. FIG. 2 is a view (side elevational view) as observed along the direction II in FIG. 1 and FIG. 3 is a view (plan view) observed along the direction III in FIG. 1.

A rod-shaped rotational shaft 1 as a body of rotation of an engine (not shown) has two semi-circular teeth 2 and 3 each comprising a semi-circular plate member secured thereto. The two semi-circular teeth 2 and 3 are made of a magnetic material as an object to be detected and are parallel to each other. Each of the semi-circular teeth (semi-circular plate members) 2 and 3 is disposed within a range of an angle of rotation of 180° on a plane perpendicular to an axis of the rotational shaft 1 and, as shown in FIG. 3, spaced apart from each other by a predetermined pitch P in the axial direction of the rotational shaft 1. Further, both of the semi-circular teeth (semi-circular plate members) 2 and 3 are disposed in different angular rotation range so as not to overlap with each other as viewed from the direction II (axial direction) in FIG. 1.

On the other hand, a sensor main body 4 is fixedly mounted and spaced apart in a direction perpendicular to the axis of the rotational shaft 1. The sensor main body 4 comprises a bias magnet 5 made of a permanent magnet and a substrate 7 on which magnetic resistance elements 6a and 6b are disposed. The substrate 7 is held in perpendicular relation to the teeth 2 and 3. The bias magnet 5 has a cylindrical shape, in which one side 5a is magnetized as an N-pole and the other side 5b is magnetized an as S-pole. The bias magnet 5 is disposed at the same height as the rotational shaft 1, and the N-pole magnetized side 5a of the bias magnet 5 faces the rotational shaft 1. Thus, the bias magnet 5 generates a bias magnetic field toward the rotational shaft 1 along the direction perpendicular to the axis of rotational shaft 1.

Figure 4:
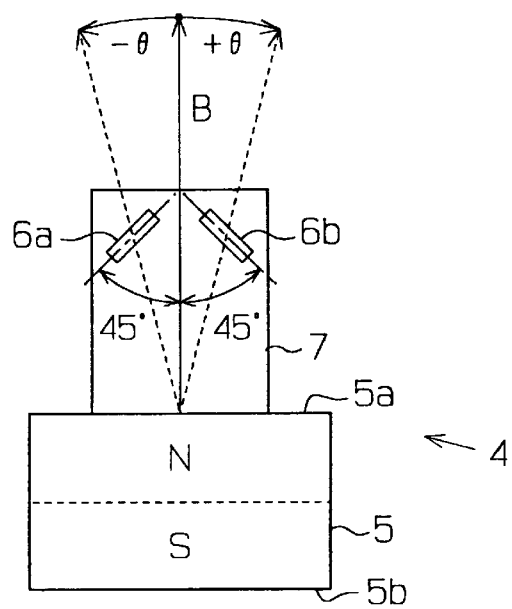
FIG. 4 is an enlarged view of a sensor main body.

A rectangular substrate 7 is bonded at one end face to the N-pole magnetized side 5a of the bias magnet 5. The substrate 7 is disposed horizontally and the substrate 7 and the rotational shaft 1 are disposed at the same height. Two magnetic resistance elements 6a and 6b are vapor deposited on the side of the substrate 7. As shown in FIG. 4, each of the magnetic resistance elements 6a and 6b has a strip-shape and extends linearly. The magnetic resistance elements 6a and 6b are disposed as a pair each inclined at about ±45° relative to the magnetic vector B generated from the bias magnet 5. That is, the magnetic resistance elements 6a and 6b are disposed being slanted each by about 45° to the direction in perpendicular to the axis of the rotational shaft 1. Further, the magnetic resistance elements 6a and 6b are disposed, as shown in FIG. 3, in a direction perpendicular to the axis of the rotational shaft 1 at a mid position for the position of disposing the two semi-circular teeth 2 and 3 in the axial direction of the rotational shaft 1. That is, the magnetic resistance elements 6a and 6b are disposed in the bias magnetic field on a plane perpendicular to the axis of the rotational shaft 1 at a position deviated from the position of disposing the semi-circular teeth 2 and 3 in the axial direction of the rotational shaft 1. Further, the semi-circular teeth 2 and 3 and the substrate 7 are spaced apart by a predetermined gap (air gap) G along the direction perpendicular to the axis of the rotational shaft 1.

As shown in this embodiment, the bias magnetic field changes deflecting in an axial direction of the rotational shaft 1 by the rotation of the semi-circular teeth 2 and 3 following the rotation of the rotational shaft 1. In this embodiment, if the plane on which a magnetic resistance element pattern is formed is disposed in parallel with a plane on which the bias magnetic field deflects, the resistance changes by the change of the bias magnetic field in a sinusoidal form at a period of 180° around the magnetic resistance elements 6a and 6b. Assuming one direction along a longer side of the strip as 0°, the resistance value decreases linearly or proportionally as the bias magnetic field changes from 0° to the direction of 90° relative to the longer side direction of the strip (perpendicular direction), and the resistance value is saturated at a minimum value near 90° of the bias magnetic field, whereas the resistance value increases monotonously as the bias magnetic field changes from 90° to 180°, and the resistance value is saturated at a maximum value near 180° of the bias magnetic field. Accordingly, maximum change of the resistance value is obtainable when the bias magnetic field changes in the 0° direction and 90° direction with 45° direction being as the center relative to the longer side direction of the strip-like magnetic resistance element.

Accordingly, as shown in FIG. 4, in the case where the magnetic resistance elements 6a and 6b are disposed at a position where the bias magnetic field is changed by the semi-circular teeth 2 and 3 within a range of ±θ around a direction B perpendicular to the axis of the rotational shaft 1 as the center and further disposed being slanted in a 45° with respect to the direction B, the bias magnetic field is applied within the range of ±θ around 45° as the center relative to the magnetic field resistance elements 6a and 6b. Accordingly, a sensor at a high sensitivity can be provided.

Further, when the two magnetic resistance elements are used as in this embodiment and an angle therebetween is 900°, since directions of resistance change are different from each other, the resistance change is increased as a whole to provide a sensor with high sensitivity.

The angle of rotation is defined as explained below in a state shown in FIG. 1. The semi-circular tooth 3 situates above and the semi-circular tooth 2 situates below a plane formed by the side of the substrate 7 (direction of the magnetic vector detecting plane by the magnetic resistance elements 6a and 6b), the semi-circular tooth 2 situates in a space to the left and the semi-circular tooth 3 situates in a space to the right relative to the center line L of both of the magnetic resistance elements 6a and 6b. In this state, an angle of rotation 0° is given as an upward position of the rotational shaft 1 being as a reference angle. The rotational shaft 1 rotates counterclockwise.

Figure 5:
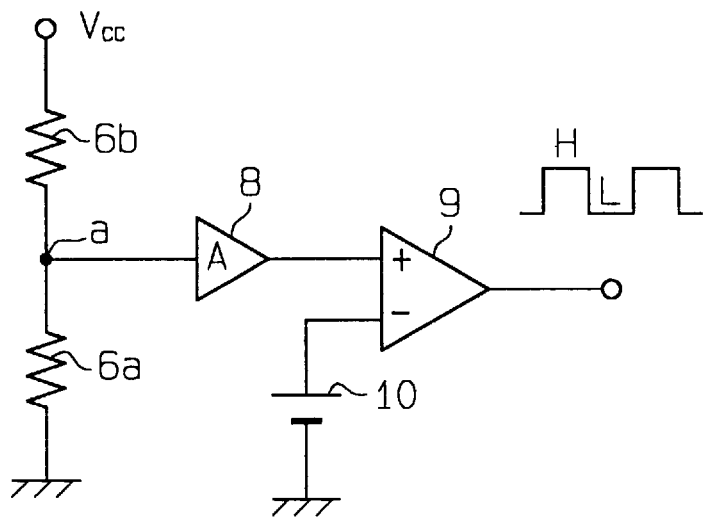
FIG. 5 is an electric circuit diagram of a rotational position sensor.

FIG. 5 shows an electric construction of the rotational position sensor. The two magnetic resistance elements 6a and 6b are connected in series to constitute a bridge circuit. The serial circuit is applied at one end with a power source voltage Vcc (5 V) and grounded at the other end to the ground. A junction a between the two magnetic resistance elements 6a and 6b in the serial circuit is connected by way of an amplifier 8 to one of input terminals of a comparator 9. A reference voltage generation source 10 is connected to the other of the input terminals of the comparator 9. Thus, a voltage at the junction a is amplified by the amplifier 8 and the amplified voltage is compared with a reference voltage from the reference voltage generation source 10, and a high or low level signal is produced depending on the comparison result.

The operation of the rotational position sensor having thus been constructed will be explained.

Figure 7:
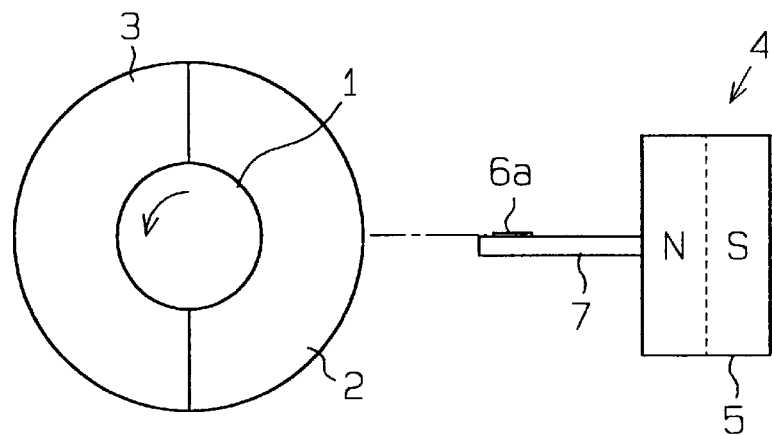
FIG. 7 is a side view for explaining the operation of the rotational position sensor in the first embodiment.
Figure 8:
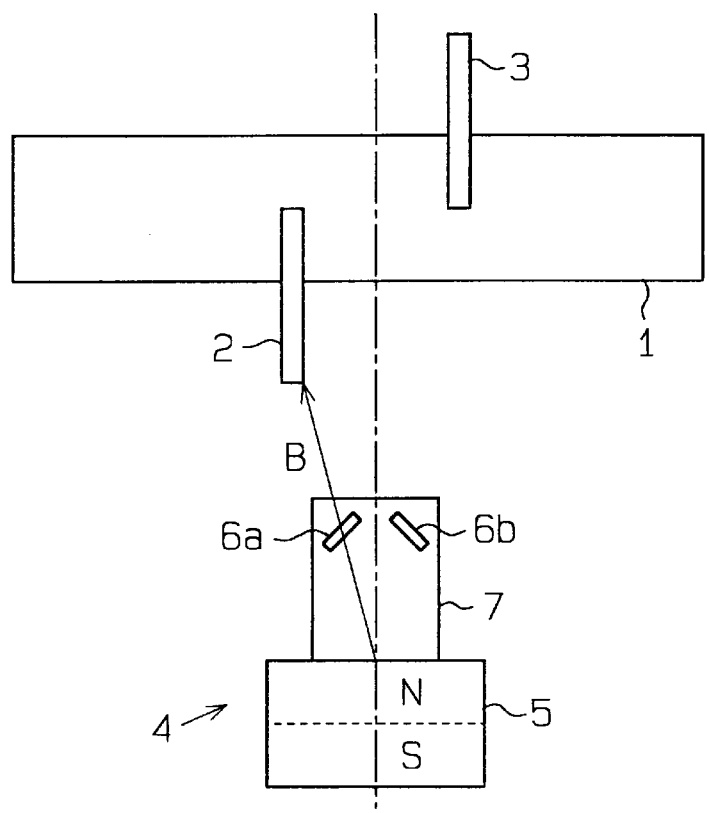
FIG. 8 is a plan view for explaining the operation of the rotational position sensor in the first embodiment.
Figure 9:
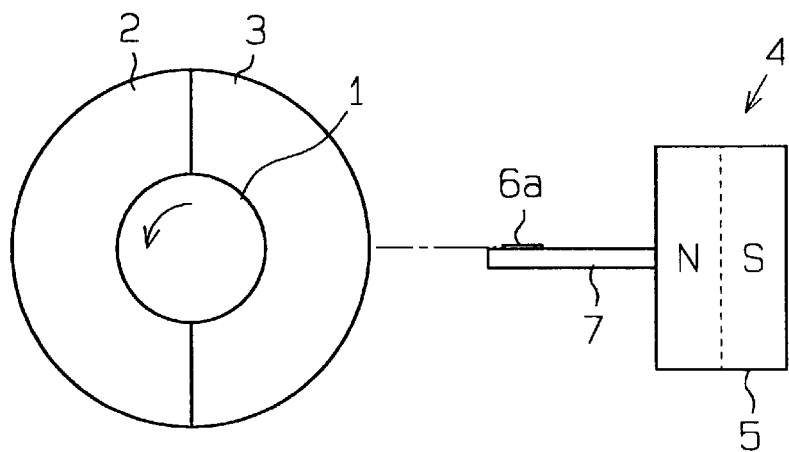
FIG. 9 is a side view for explaining the operation of the rotational position sensor in the first embodiment.
Figure 10:
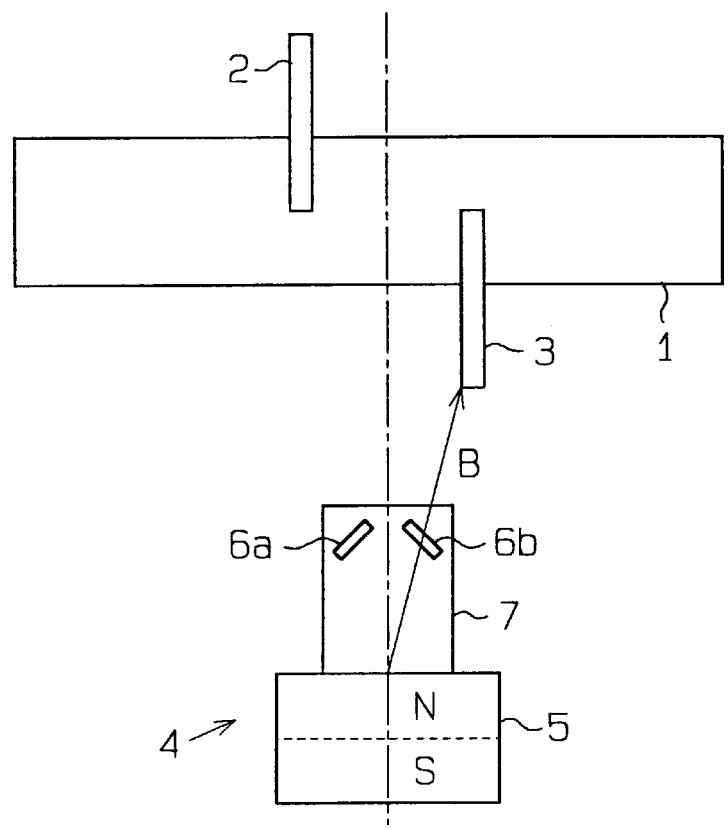
FIG. 10 is a plan view for explaining the operation of the rotational position sensor in the first embodiment.
Figure 11:
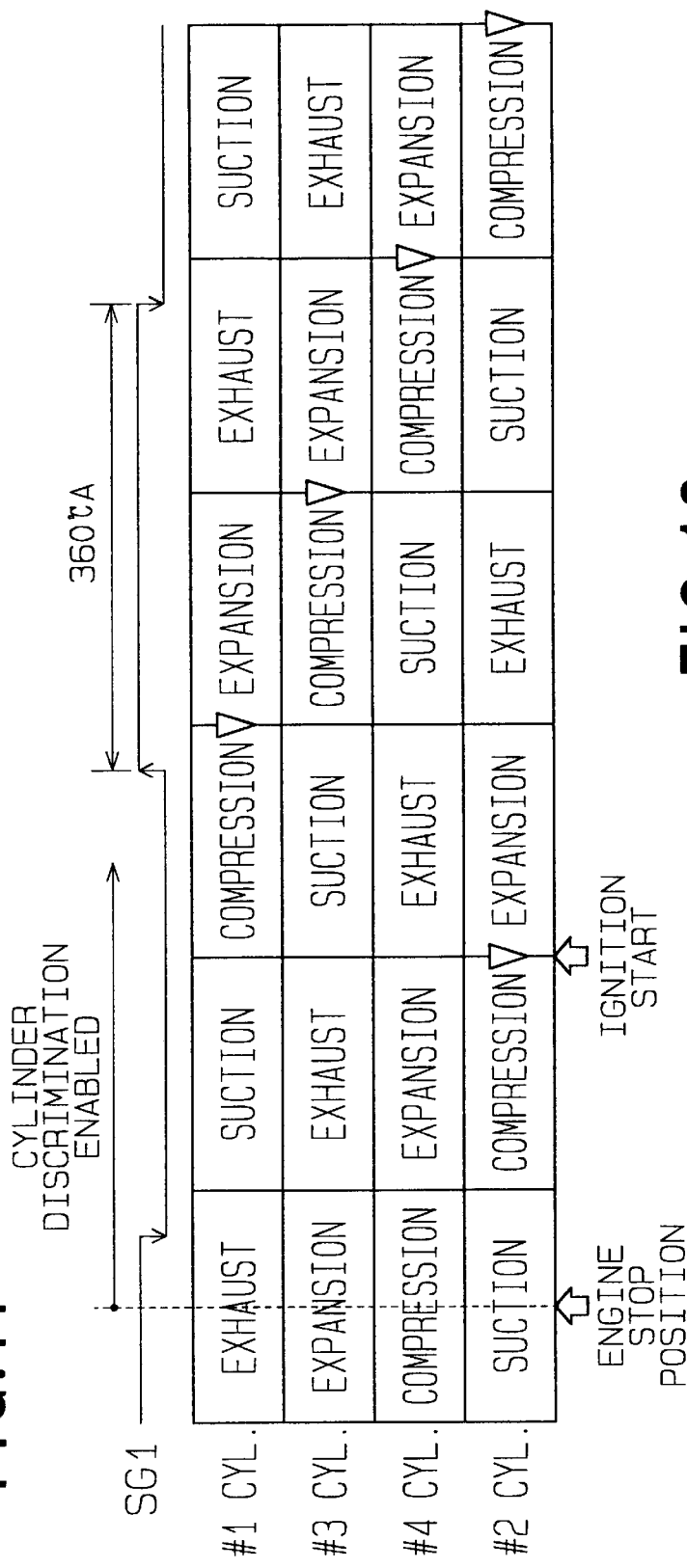
FIG. 11 is a timing chart showing a combustion cycle for explaining an ignition start timing in a 4-cylinder gasoline engine.

Referring at first to the basic principle, it utilizes a characteristic that the angle of the magnetic vector B can be detected in the magnetic resistance elements 6a and 6b. The detection accuracy becomes high when the elements 6a and 6b are disposed at 45° angle. That is, as shown in FIGS. 7 and 8, if the angle of rotation of the rotational shaft 1 is between 0° to 180°, the semi-circular tooth 2 situates closer to the left of the magnetic resistance elements 6a and 6b, and the magnetic vector B directs to leftward. On the other hand, as shown in FIGS. 9 and 10, if the angle of rotation of the rotational shaft 1 is between 180° to 360°, the semi-circular tooth 3 situates closer to the right one of the magnetic resistance elements 6a and 6b, and the magnetic vector B directs rightward. The change of the direction of the magnetic vector B is detected by the magnetic resistance elements 6a and 6b.

FIGS. 7 and 8 show the state in which the rotational shaft 1 rotates by 90° from the reference position (angle of rotation of 90°) of FIGS. 1 through 3, and FIGS. 9 and 10 show the state where the rotational shaft 1 rotates by 270° from the reference position (angle of rotation of 270°) of FIGS. 1 through 3.

Figure 6:
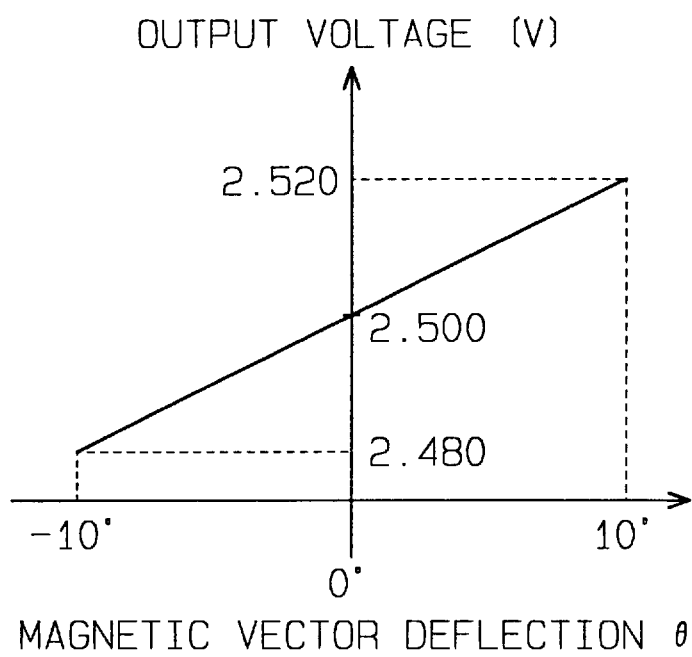
FIG. 6 is an output characteristic chart of a rotational position sensor.

Referring more specifically, in the state shown in FIGS. 1, 2 and 3, both of the semi-circular teeth 2 and 3 are present closer to the plane defined on the side of the substrate 7 (that is, the magnetic vector detecting plane by the magnetic resistance elements 6a and 6b). When the rotational shaft 1 starts rotation counter-clockwise from this reference state, the semi-circular tooth 2 situates closer to the plane defined on the side of the substrate 7 as shown in FIGS. 7 and 8 (that is, magnetic vector detecting plane by the magnetic resistance elements 6a and 6b) and the magnetic vector B deflects leftward. Then, as shown in FIG. 4, the magnetic vector B deflects leftward, that is, takes a negative value for the deflecting angle θ and, as shown in FIG. 6, the resistance value of the magnetic resistance elements 6a and 6b changes depending on the defecting angle θ and the output voltage of the bridge circuit (voltage at the junction a in FIG. 5) is lower than 2.5 V. As a result, the output of the comparator 9 is at a low level. As described above, when the angle of rotation of the rotational shaft 1 is between 0° and 180°, the semi-circular tooth 2 situates closer to the left of the magnetic resistance elements 6a and 6b, so that the magnetic vector B directs leftward and the output of the comparator 9 is at a low level signal.

Further, when the rotational shaft 1 rotates exceeding 180°, the semi-circular tooth 3 situates closer to the plane defined on the side of the substrate 7 (that is, the magnetic vector detecting plane by the magnetic resistance elements 6a and 6b) and the magnetic vector B deflects rightward. Then, as shown in FIG. 4, the magnetic vector B directs rightward, that is, the deflecting angle θ takes a positive value and, as shown in FIG. 6, the output voltage of the bridge circuit (voltage at the junction a in FIG. 5) rises to higher than 2.5 V. As a result, the output of the comparator turns to a high level. As described above, when the angle of rotation of the rotational shaft 11 is between 180° and 360°, the semi-circular tooth 3 situates to the right of the magnetic resistance elements 6a and 6b, the magnetic vector B directs rightward and the output of the comparator produces a high level signal.

Then, also upon stopping of the rotational shaft 1 (stationary state), one of the semi-circular teeth 2 and 3 situates closer to the right or left of the plane defined on the side of the substrate 7, so that the magnetic vector B directed rightward or leftward can be detected by the magnetic resistance elements 6a and 6b.

The rotational position sensor can be used as a cylinder discriminating sensor for an ignition timing control system of a multi-cylinder gasoline engine. That is, the rotational shaft 1 in FIG. 1 is used as a cam shaft (or a crank shaft) of the multi-cylinder gasoline engine. Then, the angle of rotation of the cam shaft (crank shaft) is detected and used for the discrimination of the cylinder.

In the 4-cycle engine, the crank shaft rotates twice and the cam shaft rotates once during suction—compression—expansion—exhaustion strokes. Accordingly, if a cylinder discriminating signal is obtained by a crank angle sensor disposed to the crank shaft, it can not be discriminated whether a relevant cylinder is in a suction—compression stroke or in an expansion—exhaustion stroke. Then, discrimination for the strokes is possible by using the cam angle sensor.

Then, when the sensor of this embodiment is used for the cam angle sensor, and a cylinder discriminating signal is obtained from the crank angle sensor upon starting the engine, the state of the cylinder can be discriminated and the amount of the exhaustion of the unburnt gases can be suppressed.

Various experiments were conducted and the results thereof are explained next.

Figure 12:
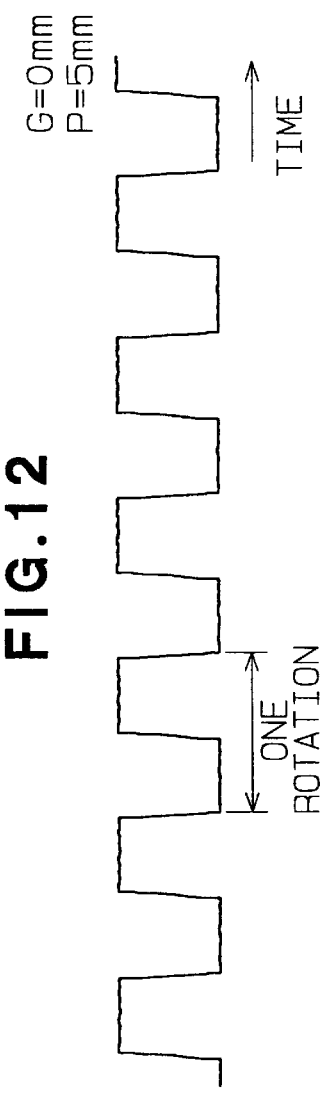
FIG. 12 is an output waveform chart of the rotational position sensor in the first embodiment.

FIG. 12 shows an output of the bridge circuit (output at the junction a in FIG. 5) in the case of setting a gap (air gap) G between the top end side of the substrate 7 and the semi-circular teeth 2 and 3 to 0 mm, and an axial pitch A between the semi-circular tooth 2 and the semi-circular tooth 3 as 5 mm.

Figure 13:
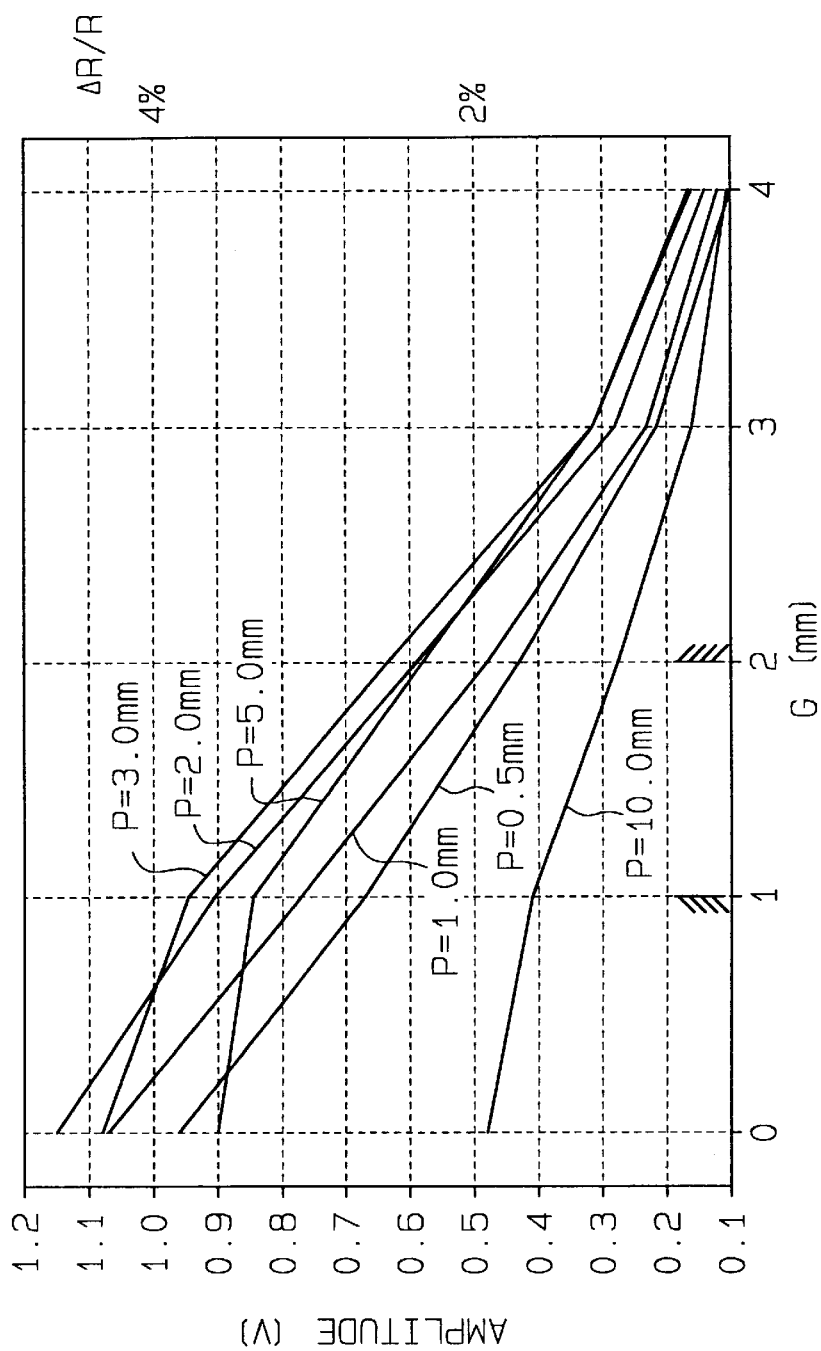
FIG. 13 is a characteristic chart illustrating a relationship between an air gap, and an output amplitude and variation coefficient of magnetic resistance when a tooth pitch is changed.

Further, FIG. 13 shows an output amplitude of the bridge circuit (output amplitude at the junction a in FIG. 5) relative to the air gap between the top end side of the substrate 7 and the semi-circular teeth 2 and 3 in the case of varying the semi-circular tooth pitch P to 0.5 mm, 1.0 mm, 2.0 mm, 3.0 mm, 5.0 mm and 10.0 mm. In this figure, the magnetic resistance variation coefficient ΔR/R is indicated on the ordinate. From FIG. 13, it can be seen that sufficient output amplitude and the magnetic resistance variation coefficient ΔR/R can be obtained at any of the semi-circular tooth pitch P in a working region for the air gap G of from 1 mm to 2 mm.

The working region of the air gap G is defined as G=1 mm to 2 mm by the following reasons. Since the top end of the sensor main body 4 (top end side of the substrate 7) is covered with a capping material and the thickness of the capping material is defined as 1 mm, the air gap G of greater than 1 mm is necessary. Further, the mounting tolerance of the sensor main body 4 (bias magnet 5 and substrate 7) is defined as 1 mm. In view of the above, the working region of the air gap G is defined as: G=1 mm–2 mm.

Then, variations caused by the mounting deviation of the sensor main body 4 were examined. The mounting deviation intended to be considered here includes (1) a mounting deviation of the sensor main body 4 in the axial direction of the rotational shaft 1 as shown by (100) in FIG. 3, (2) a mounting deviation of the sensor main body 4 in the vertical direction on the plane perpendicular to the axis of the rotational shaft 1 as shown by (200) in FIG. 2, (3) mounting deviation in the rotational direction of the sensor main body 4 as shown by (300) in FIG. 1 and mounting deviation caused by swinging of the sensor main body 4 as shown by (400) in FIG. 3.

In this experiment, the semi-circular tooth pitch P was defined as 0.5 to 10 mm, and the air gap G was defined as 0–4 mm. Further, as shown in FIG. 1, in a 3-axis (three-dimensional) system orthogonal coordinate, it is defined that the axial direction of the rotational shaft 1 is on X-axis, the vertical direction on the plane perpendicular to the axis of the rotational shaft 1 is on Y-direction and the remaining axis is on Z-axis.

Figure 14:
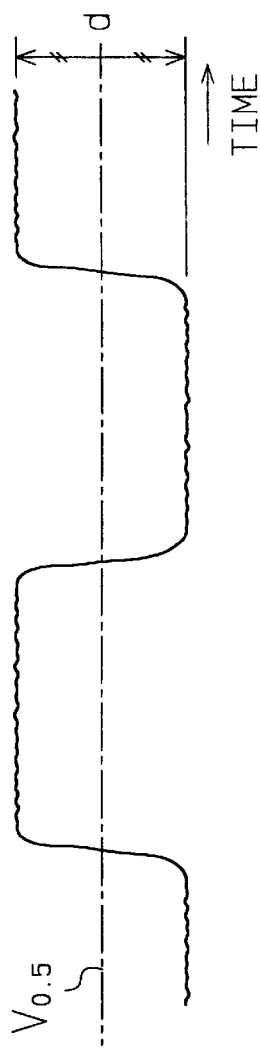
FIG. 14 is an output waveform chart of the rotational position sensor in the first embodiment.

Then, as a permissible range for the mounting deviation, it was examined as to whether the following relationship is satisfied or not:

$$0.4 \times d > \Delta V_{0.5} \quad (1)$$

where d represents an output amplitude, $V_{0.5}$ represents a voltage at 50% amplitude (mid point voltage) and, further, $\Delta V_{0.5}$ represents deviation between the value $V_{0.5}$ with no mounting deviation and the value $V_{0.5}$ with mounting deviation as shown in FIG. 14.

Figure 15:
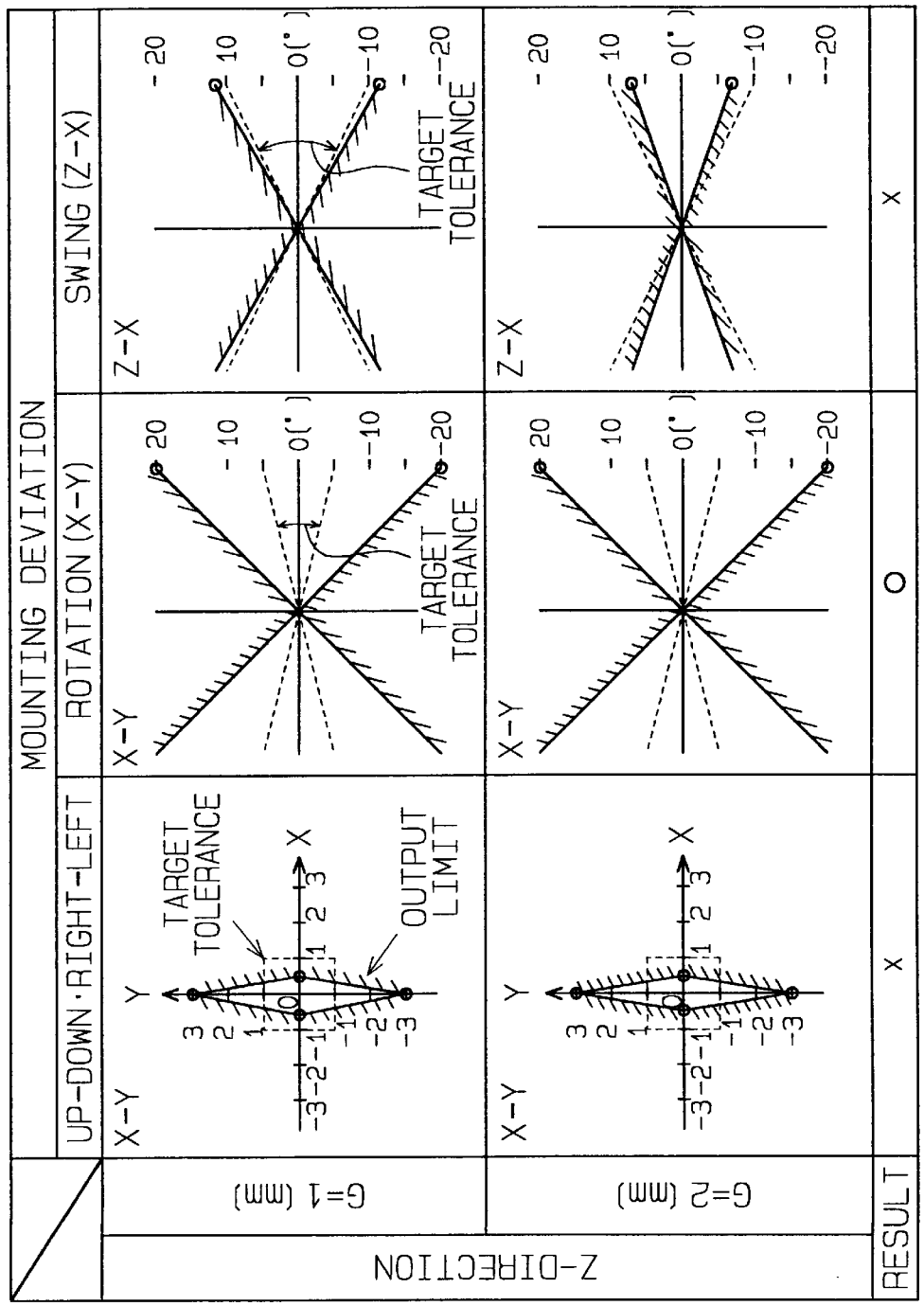
FIG. 15 is an explanatory view for explaining the result of experiment for mounting deviation.
Figure 16:
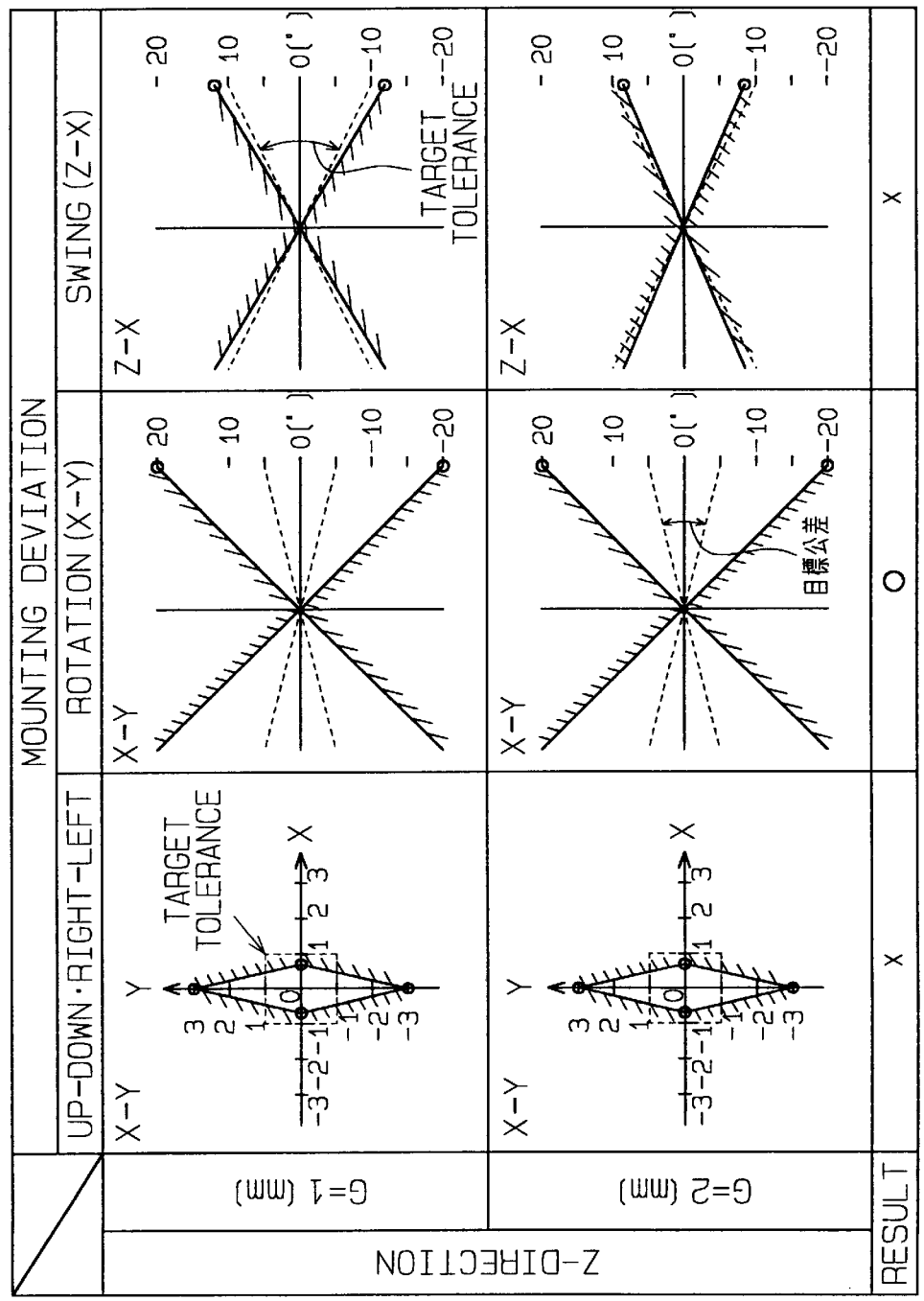
FIG. 16 is an explanatory view for explaining the result of experiment for mounting deviation.
Figure 17:
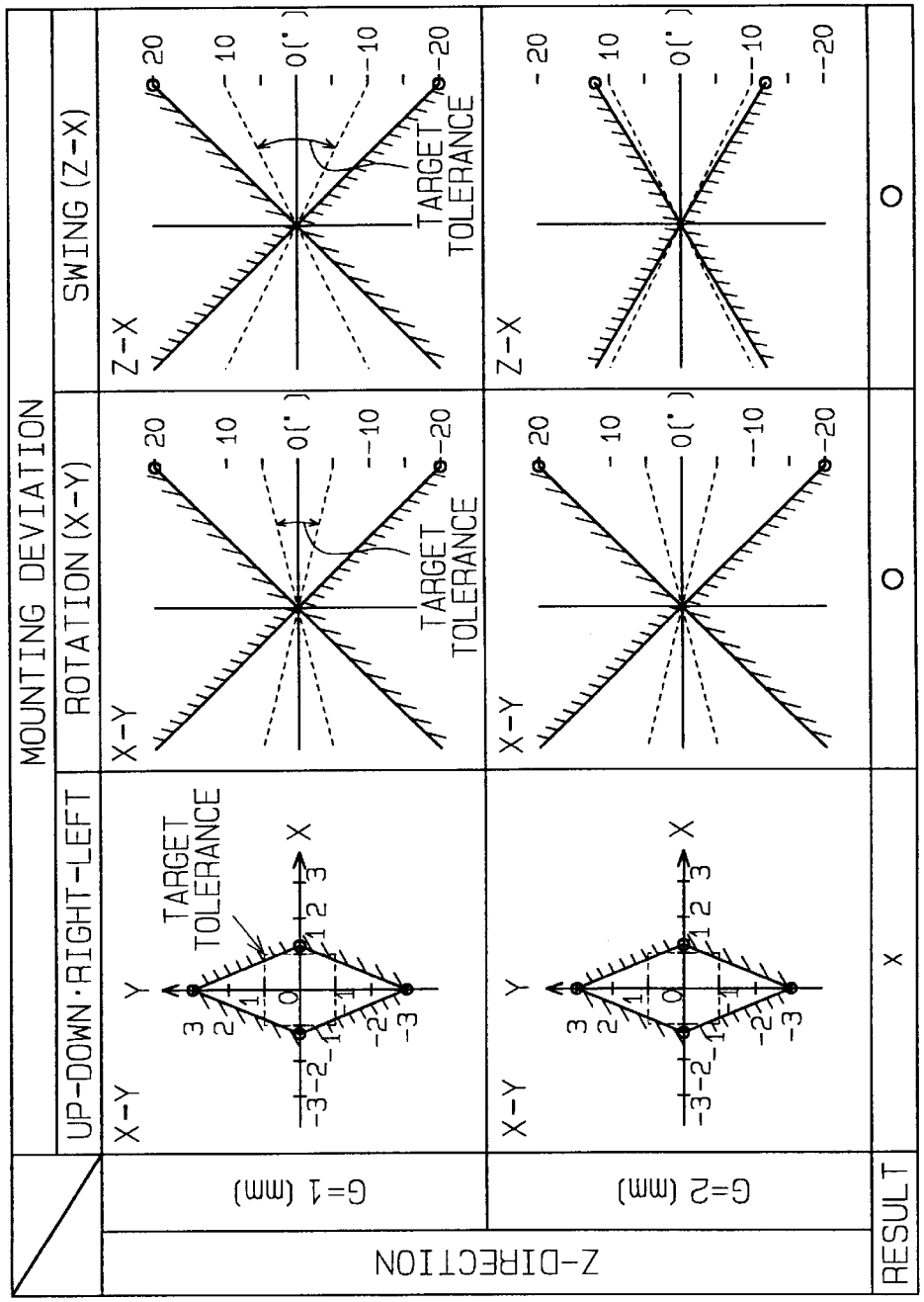
FIG. 17 is an explanatory view for explaining the result of experiment for mounting deviation.
Figure 18:
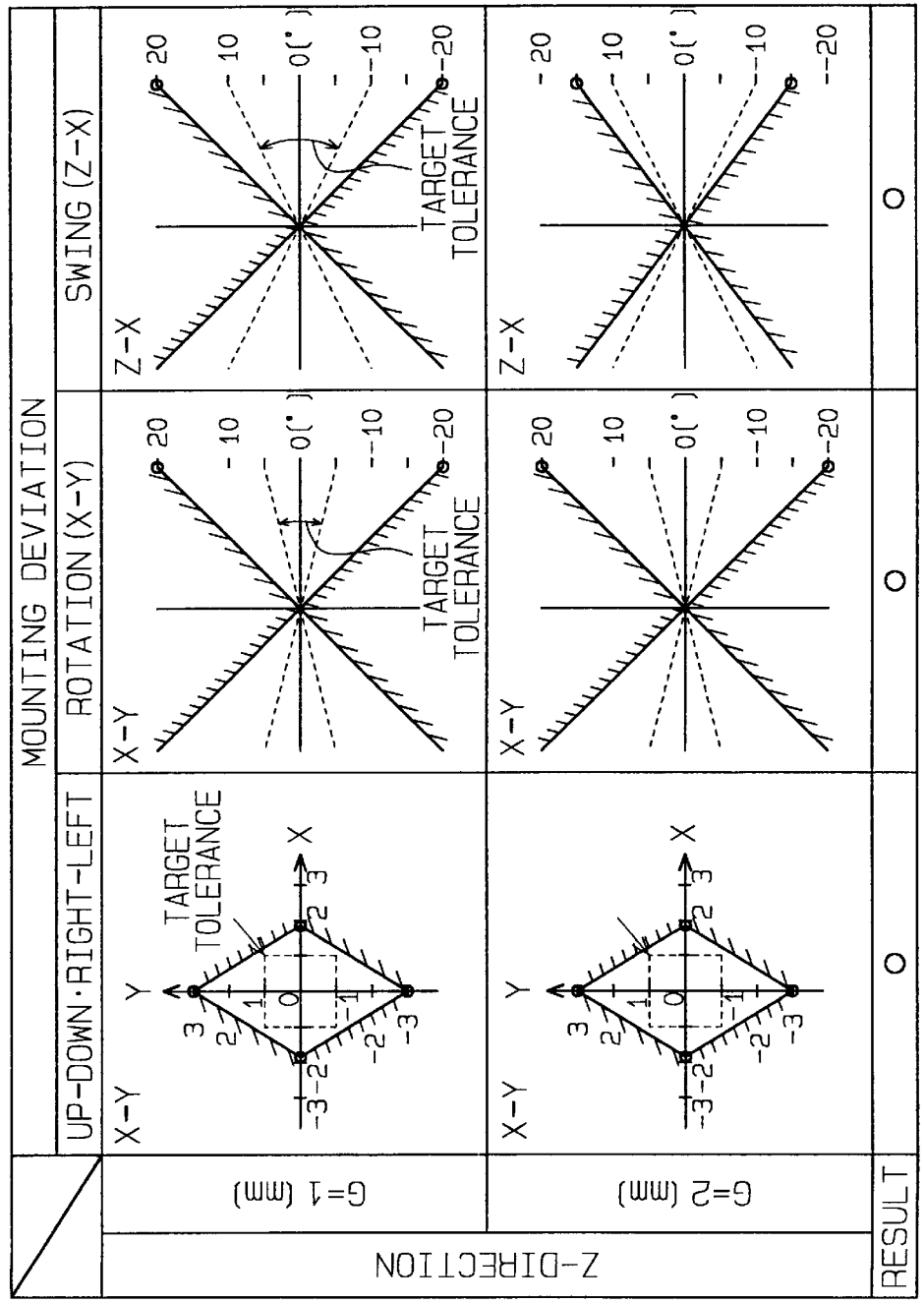
FIG. 18 is an explanatory view for explaining the result of experiment for mounting deviation.
Figure 19:
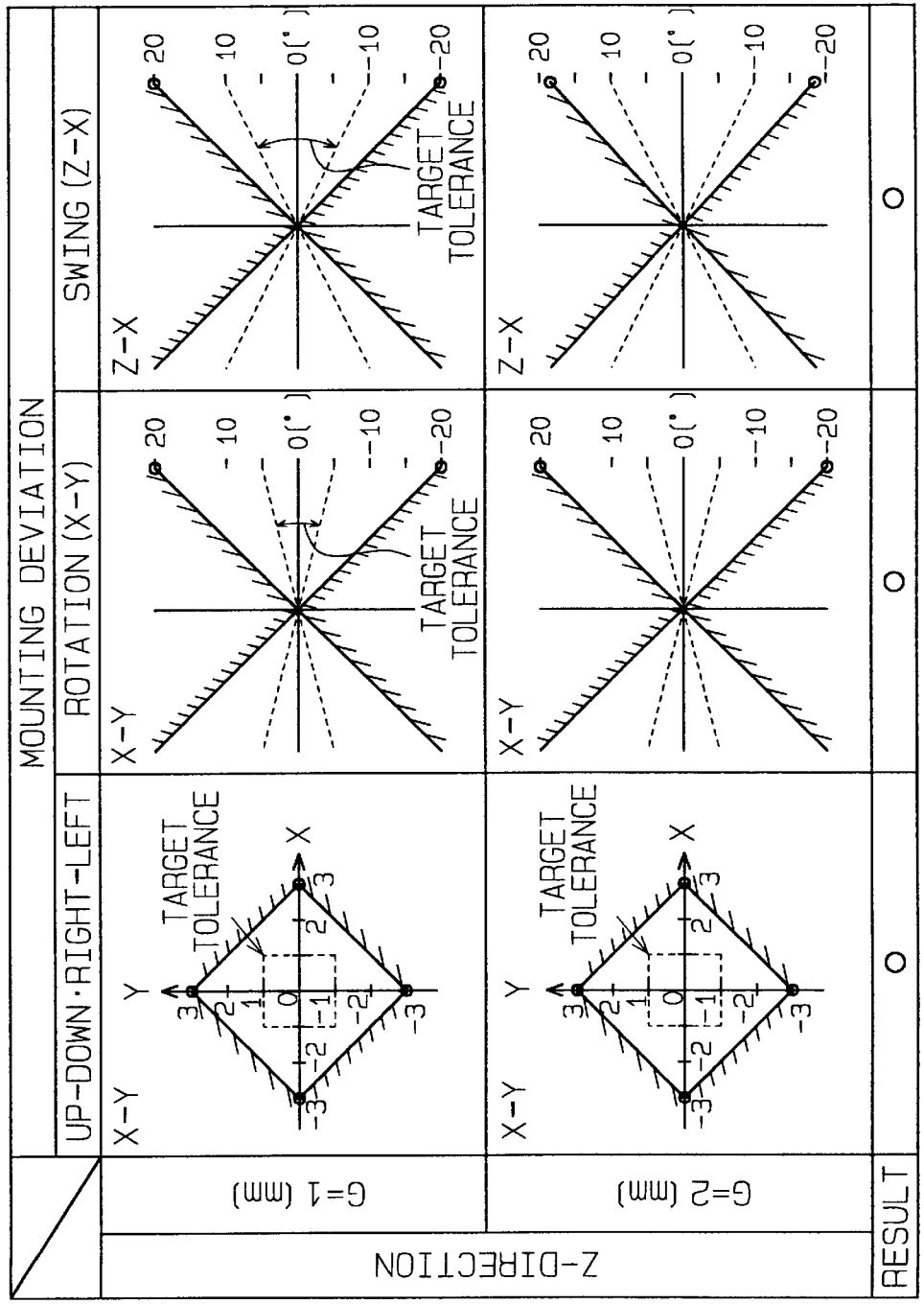
FIG. 19 is an explanatory view for explaining the result of experiment for mounting deviation.
Figure 20:
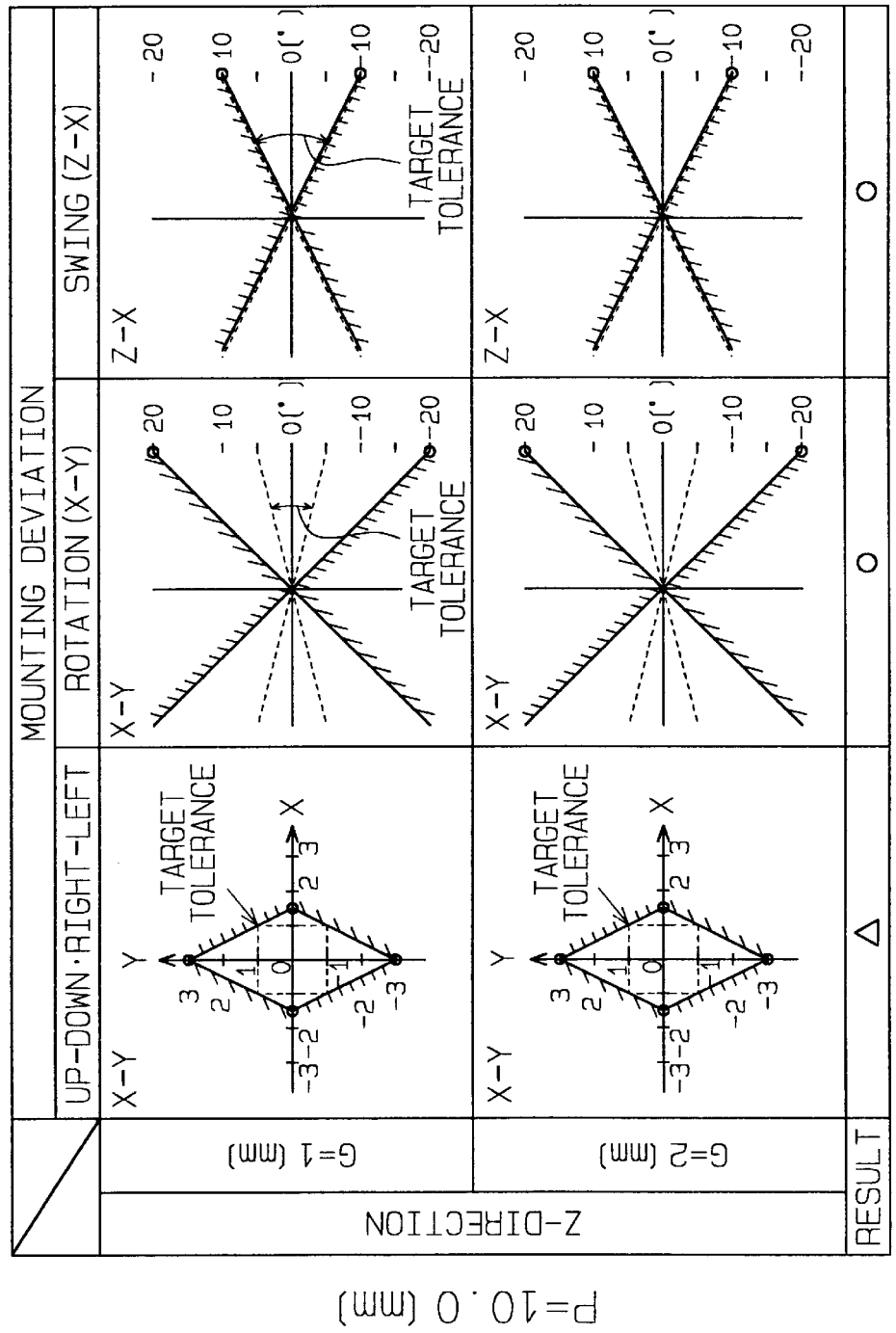
FIG. 20 is an explanatory view for explaining the result of experiment for mounting deviation.

The results are shown in FIGS. 15–20. FIG. 15 shows, by hatched lines, a region not satisfying the relation (1) relative to each of the mounting deviation at the semi-circular tooth pitch P=0.5 mm and the air gap G=1 mm and P=2 mm. In the same way, FIG. 16 shows the case in which the semi-circular tooth pitch P=1.0 mm, FIG. 17 shows the case in which the semi-circular tooth pitch P=2.0 mm, FIG. 18 shows the case in which the semi-circular tooth pitch P=3.0, FIG. 19 shows the case in which the semi-circular tooth pitch P=5.0 mm and FIG. 20 shows the case in which the semi-circular tooth pitch P=10.0 mm, respectively.

Further, shown in FIGS. 15–20 are target tolerances which will be required for actually using the sensor, and the results of judgment as "○ (allowable)", "Δ (between allowable and not allowable)" and "× (not allowable)" by determining whether the target tolerance is attained or not. In FIGS. 15–20, the upper limit for the working temperature of the sensor (upper limit for the atmospheric temperature) is assumed as 150° C.

From the figures, it can be seen that a broader region without hatched lines can provide a broader allowable range as the mounting displacement and thus provide excellent practical usefulness. As a result, it has been found that the semi-circular tooth pitch P of 3.0 to 5.0 mm is optimum.

As described above, this embodiment comprises the semi-circular teeth 2 and 3 made of a magnetic material (object to be detected) fixed to the rotational shaft 1 (body of rotation) and disposed within a predetermined range of the angle of rotation on a plane perpendicular to the axis of the rotational shaft 1, the bias magnet 5 generating the bias magnetic field to the rotational shaft 1 from the direction perpendicular to the axis of the rotational shaft 1, and the magnetic resistance elements 6a and 6b disposed in the bias magnetic field on the plane including the axis of the rotational shaft 1 at a position deviated from the position for disposing the semi-circular teeth 2 and 3 in the axial direction of the rotational shaft 1 being inclined by about 45° relative to the direction perpendicular to the axis of the rotational shaft 1. Accordingly, since the semi-circular teeth 2 and 3 are disposed within the predetermined range of the angle of rotation on the plane perpendicular to the axis of the rotational shaft 1, when the magnetic vector directs to the semi-circular teeth 2 and 3, this is detected by the magnetic resistance elements 6a and 6b. Namely, the magnetic vector deflects in the axial direction of the rotational shaft 1 depending on the angle of rotation, which is detected by the magnetic resistance elements 6a and 6b. As a result, even when the rotational shaft 1 is in a stationary state, it is detected to be within the predetermined range of the angle of rotation. In this way, the rotational position can be detected easily also in the stationary state of the rotational shaft 1.

Further, since the object to be detected comprises the semi-circular teeth (semi-circular teeth 2 and 3), one-half angle in 360° for one rotation can be detected by the semi-circular teeth 2 and 3.

Further, since the two semi-circular teeth 2 and 3 are provided, both of the teeth 2 and 3 are disposed being spaced apart in the axial direction of the rotational shaft 1 and the magnetic resistance elements 6a and 6b are disposed in the gap G between both of the teeth 2 and 3 in the axial direction of the rotational shaft 1, the deflecting angle of the magnetic vector is made greater than in the case of using only one tooth and the detection accuracy can be improved.

Although the two semi-circular teeth 2 and 3 are provided in the foregoing embodiment, the present invention is applicable also to the case of using only one tooth. For example, the semi-circular tooth 2 in FIGS. 1–3 is removed and only the semi-circular tooth 3 is disposed. In this instance, since the semi-circular tooth is not present closer to the magnetic vector detecting plane of the magnetic resistance elements 6a and 6b, within a range of the angle of rotation from 0° to 180°, the magnetic vector B directs forwardly. On the other hand, since the semi-circular tooth 2 situates closer within a range of the angle of rotation from 180° to 360°, the magnetic vector B directs rightward.

Second Embodiment

A second embodiment will be described mainly on the difference from the first embodiment.

Figure 21:
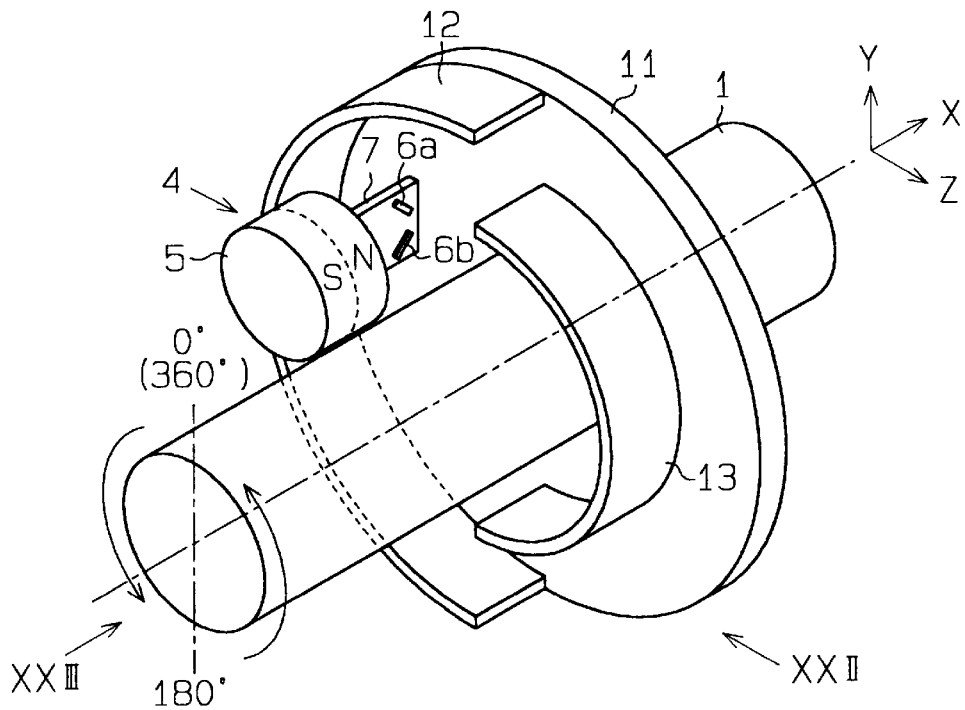
FIG. 21 is a perspective view of a rotational position sensor according to a second embodiment of the present invention.
Figure 22:
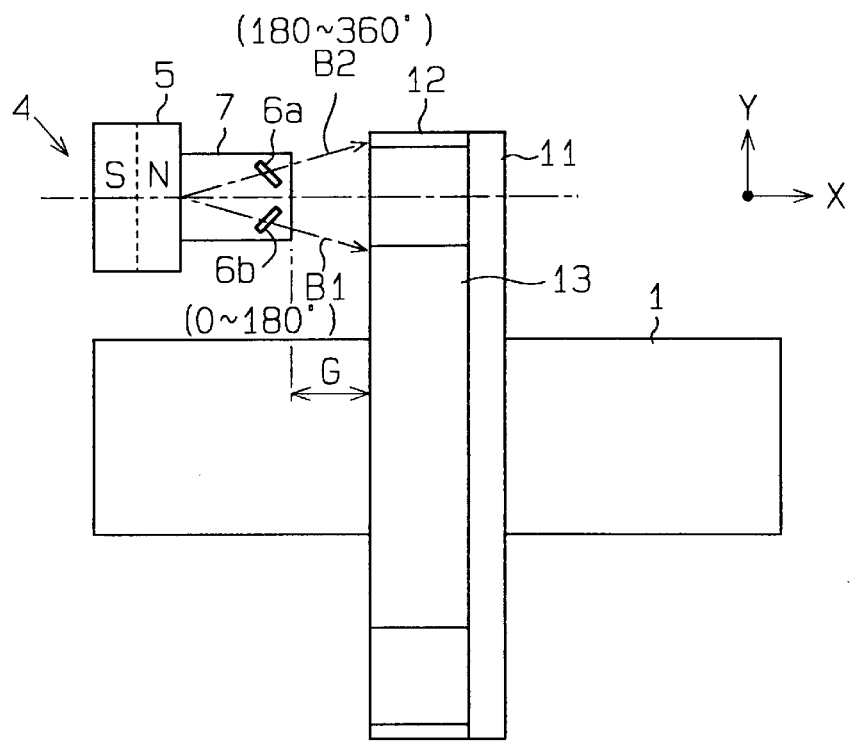
FIG. 22 is a side view observed along an arrow XXII in FIG. 21.
Figure 23:
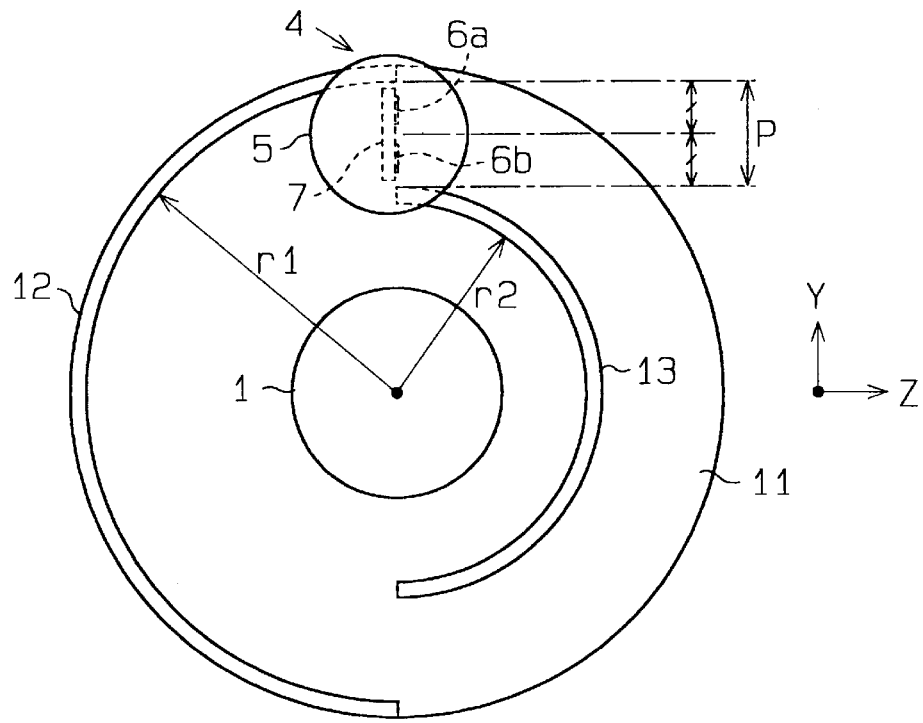
FIG. 23 is a side view observed along an arrow XXIII in FIG. 21.
Figure 24:
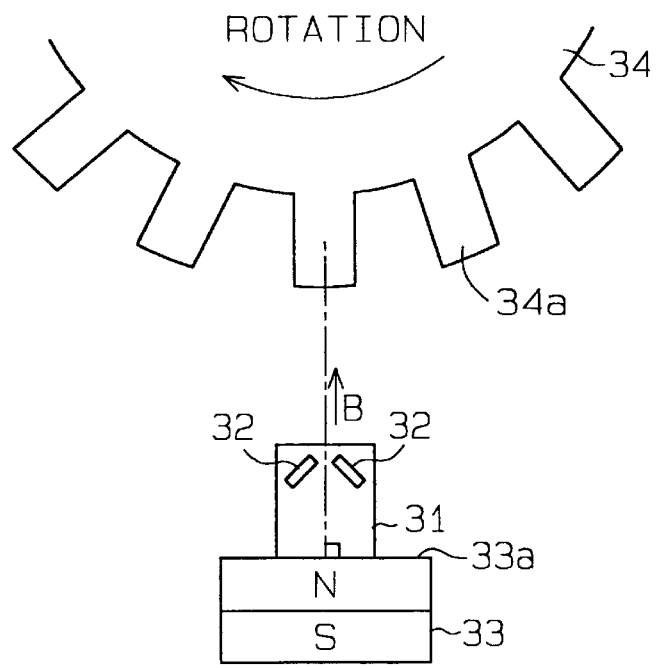
FIG. 24 is an explanatory view illustrating a conventional rotation sensor.
Figure 25:
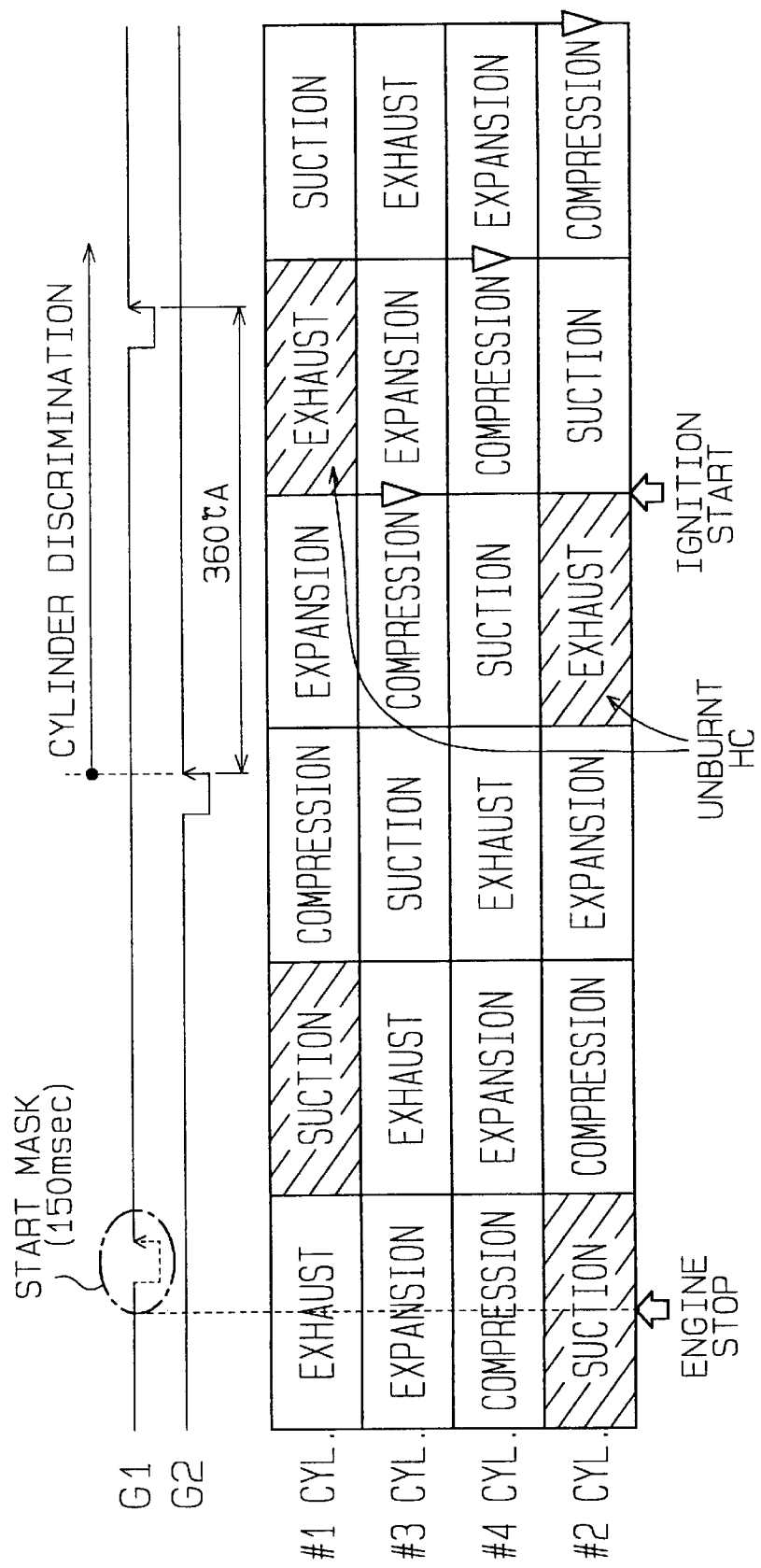
FIG. 25 is a timing chart showing combustion cycles for explaining an ignition start timing in a conventional 4-cylinder gasoline engine.

FIG. 21 shows a perspective view of a rotational position sensor. FIG. 22 is a side view as observed along direction XXII in FIG. 22 (front elevational view) and FIG. 23 is a side view as observed along direction XXIII in FIG. 21 (side elevational view).

In the first embodiment, the sensor main body 4 is disposed in a direction perpendicular to the axis of the rotational shaft 1. In this second embodiment, however, a sensor main body 4 is disposed in a direction parallel with the axis of the rotational shaft 1.

The rotational shaft 1 has a disc 11 fixed to a plane perpendicular to the axis of the shaft 1. Two semi-annular ridges 12 and 13 are extended axially on one side of the disc 11. The semi-annular ridges 12 and 13 each comprises a thin plate member made of a magnetic material and constitute an object to be detected. The semi-circular ridge 12 has a radius r1 and extends over 180°. The semi-circular ridge 13 has a radius r2 smaller than the radius r1 of the semi-circular ridge 12 and extends circumferentially for 180°. The semi-circular ridges 12 and 13 are disposed coaxially with the axial center of the rotational shaft 1, such that the semi-circular ridge 12 is present for the angle of rotation from 0° to 180° relative to a reference position, and such that the semi-circular ridge 13 is present for the angle of rotation from 180° to 360° relative to the reference position. Thus, the semi-circular ridges 12 and 13 are arranged to be spaced apart from each other by a distance P (approximately: r1–r2) in the radial direction of the rotational shaft 1.

Further, the sensor main body 4 (magnetic resistance elements 6a and 6b, the substrate 7 and the bias magnet 5) is disposed in parallel with the axis of the rotational shaft 1. That is, the bias magnet 5 is disposed such that the bias magnetic field is generated from a direction parallel with the axis of the rotational shaft 1 to the center for the position of disposing the semi-annular ridges 12 and 13 in the radial direction of the rotational shaft 1. Further, the substrate 7 is disposed vertically (disposed in an erected state), and the magnetic resistance elements 6a and 6b on the side of the substrate 7 are disposed in the bias magnetic field. The magnetic resistance elements 6a and 6b are adapted such that the change of the direction of the magnetic vector B in the radial direction of the rotational shaft 1 can be detected.

Then, within a range of the angle of rotation of the rotational shaft 1 from 0° to 180°, the semi-circular ridge 13 situates closer to a plane defined on the side of the substrate 7 (that is, the magnetic vector detecting plane by the magnetic resistance elements 6a and 6b), and the direction of the magnetic vector B deflects downward (indicated by B1 in FIG. 22). Further, within a range of the angle of rotation of the rotational shaft 1 from 180° to 360°, the semi-circular ridge 12 situates closer to a plane defined on the side of the substrate 7 (that is, the magnetic vector detecting plane by the magnetic resistance elements 6a and 6b), and the direction of the magnetic vector B deflects upward (indicated by B1 in FIG. 22).

As described above, in this embodiment, the semi-annular ridges 12 and 13 are made of the magnetic material (object to be detected), fixed to the rotational shaft 1 (body of rotation), and have the predetermined radii r1 and r2 coaxially with the axial center of the rotational shaft 1 on the plane perpendicular to the rotational shaft 1 within the predetermined range of the angle of rotation (0° to 180° and 180° to 360°). The bias magnet 5 generates the bias magnetic field directing from the direction parallel with the axis of the rotational shaft 1 to the semi-annular ridges 12 and 13. The magnetic resistance elements 6a and 6b are disposed in the bias magnetic field at a position deviated from the position of disposing the semi-annular ridges 12 and 13 in the radial direction of the rotational shaft 1 and arranged within a plane including the axis of the rotational shaft 1 and disposed to be inclined by about 45° relative to the direction in parallel with the axis of the rotational shaft 1. Accordingly, since the semi-annular ridges 12 and 13 are disposed within the predetermined range of the angle of rotation on the plane perpendicular to the axis of the rotational shaft 1, when the magnetic vector directs to the semi-annular ridges 12 and 13, this is detected by the magnetic resistance elements 6a and 6b. That is, the magnetic vector deflects in the radial direction of the rotational shaft 1 depending on the angle of rotation and this is detected by the magnetic resistance elements 6a and 6b. As a result, even when the rotational shaft 1 is in a stationary state, it is determined to be within the predetermined range of the angle of rotation. In this way, the rotational position can be detected easily also in the stationary state of the rotational shaft 1.

Further, since the object to be detected comprises the semi-annular ridges (semi-annular ridges 12 and 13), one-half angle in 360° for one rotation can be detected by the semi-annular ridges 12 and 13.

Further, since the two semi-annular ridges 12 and 13 are provided, both of the ridges 12 and 13 have different radii (r1 is not equal with r2), and the magnetic resistance elements 6a and 6b are disposed being directed to the gap between both of the ridges 12 and 13 in the radial direction of the rotational shaft 1, the deflecting angle of the magnetic vector is made greater than the case of using only one ridge, and the detection accuracy can be improved.

Although the two semi-annular ridges 12 and 13 are provided in the foregoing second embodiment, the present invention is applicable also to the case of using only one tooth. For example, the semi-annular ridge 12 in FIGS. 21–23 may be removed and only the semi-annular ridge 13 may be disposed. In this instance, since the semi-annular ridge is not present closer to the magnetic vector detecting plane of the magnetic resistance elements 6a and 6b within a range of the angle of rotation from 0° to 180°, the magnetic vector B directs forwardly. On the other hand, since the semi-annular ridge 12 situates closer within the range of the angle of rotation from 180° to 360°, the magnetic vector B directs rightward.

The present invention having been described should not be limited to the disclosed embodiments but may be modified in many other ways without departing from the spirit of the invention.

What is claimed is:

1. A position sensor comprising:
   an object to be detected made of a magnetic material fixed to a body of rotation and disposed within a predetermined range of an angle of rotation on a plane perpendicular to an axis of the body of rotation;
   a bias magnet magnetized in an axial direction thereof for generating a bias magnetic field to the body of rotation in a direction perpendicular to the axis of the body of rotation, said bias magnet being disposed radially outwardly of the object; and a magnetic resistance element disposed in the bias magnetic field generated directly from said bias magnet, at a position deviated from the position of disposing the object to be detected in an axial direction of the body of rotation and detecting a direction of a magnetic vector in the axial direction of the body of rotation, said magnetic resistance element being positioned on a plane which extends from one magnetic pole side of said bias magnet in the axial direction of said bias magnet, whereby said magnetic resistance element is subjected to a greatest possible magnetic field.

2. A position sensor as defined in claim 1, wherein the object to be detected includes a first semi-circular tooth.

3. A position sensor as defined in claim 2, wherein the object to be detected further includes a second semi-circular tooth and the first tooth and the second tooth are spaced apart from each other in a circumferential direction of the body of rotation.

4. A position sensor comprising:

an object to be detected made of a magnetic material fixed to a body of rotation and disposed within a predetermined range of an angle of rotation on a plane perpendicular to an axis of the body of rotation;

a bias magnet magnetized in an axial direction thereof for generating a bias magnetic field to the body of rotation in a direction perpendicular to the axis of the body of rotation; and a magnetic resistance element disposed in the bias magnetic field generated directly from said bias magnet, at a position deviated from the position of disposing the object to be detected in an axial direction of the body of rotation and detecting a direction of a magnetic vector in the axial direction of the body of rotation, said magnetic resistance element being positioned on a plane which extends from one magnetic pole side of said bias magnet in the axial direction of said bias magnet, whereby said magnetic resistance element is subjected to a greatest possible magnetic field, wherein the magnetic resistance element is disposed on a plane including the axis of the body of rotation and inclined by about 45° relative to a direction perpendicular to the axis of the body of rotation.

5. A position sensor comprising:

an object to be detected made of a magnetic material, fixed to a body of rotation, so as to be disposed at a predetermined radius from an axis of the body of rotation and extending in parallel to and in an axial direction of said axis of the body of rotation and disposed within a predetermined range of an angle of rotation on a plane perpendicular to the axis of the body of rotation;

a bias magnet magnetized in an axial direction thereof for generating a bias magnetic field to the body of rotation in a direction parallel with the axis of the body of rotation; and a magnetic resistance element disposed in the bias magnetic field generated directly from said bias magnet, at a position deviated from a position of disposing the object to be detected in a radial direction of the body of rotation and detecting a direction of a magnetic vector in a radial direction of the body of rotation, said magnetic resistance element being positioned away from one magnetic pole side of said bias magnet in a direction of said magnetic field generated directly from said bias magnet and in the axial direction of said bias magnet, whereby said magnetic resistance element is subjected to a greatest possible magnetic field.

6. A position sensor as defined in claim 5, wherein the object to be detected includes a first semi-annular ridge.

7. A position sensor as defined in claim 6, wherein the object to be detected further includes a second semi-annular ridge, and the first ridge and the second ridge are spaced apart from each other in a circumferential direction of the body of rotation.

8. A position sensor comprising:

an object to be detected made of a magnetic material, fixed to a body of rotation, having a predetermined radius coaxial with an axial center of the body of rotation and disposed within a predetermined range of an angle of rotation on a plane perpendicular to the axis of the body of rotation;

a bias magnet magnetized in an axial direction thereof for generating a bias magnetic field to the body of rotation in a direction parallel with the axis of the body of rotation; and a magnetic resistance element disposed in the bias magnetic field generated directly from said bias magnet, at a position deviated from a position of disposing the object to be detected in a radial direction of the body of rotation and detecting a direction of a magnetic vector in a radial direction of the body of rotation, said magnetic resistance element being positioned away from one magnetic pole side of said bias magnet in a direction of said magnetic field generated directly from said bias magnet and in the axial direction of said bias magnet, whereby said magnetic resistance element is subjected to a greatest possible magnetic field, wherein the magnetic resistance element is disposed on a plane including the axis of the body of rotation and inclined by about 45° relative to a direction parallel to the axis of the body of rotation.

9. A position sensor for detecting a position of a rotation body, said sensor comprising:

a first arcuate member extending circularly around the rotation body by a first predetermined angle of rotation of the rotation body;

a second arcuate member extending circularly around the rotation body by a second predetermined angle of rotation of the rotation body, said second arcuate member being spaced apart from the first arcuate member in a direction of rotation of the rotation body and in one of an axial direction and a radial direction relative to an axis of the rotation body;

a bias magnet magnetized in an axial direction thereof and disposed between the first arcuate member and the second arcuate member for generating a bias magnetic field in a direction perpendicular to the one of the axial direction and the radial direction, the direction of the bias magnetic field being varied by the first arcuate member and the second arcuate member; and a sensing member disposed between the bias magnet and the rotation body and responsive to a change in the direction of the bias magnetic field, said sensing member being positioned away from one magnetic pole side of said bias magnet in a general direction of said magnetic field generated directly from said bias magnet and in the axial direction of said bias magnet whereby said sensing member is subjected to a greatest possible magnetic field.

10. A position sensor according to claim 1, wherein said bias magnet comprises a single permanent magnet, and said magnetic resistance element is disposed between said object to be detected and said one magnetic pole side.

11. A position sensor according to claim 1, further comprising:
a circuit connected to said magnetic resistance element to convert a change in a resistance of said magnetic resistance element into a corresponding electrical signal in a pulse form.

12. A position sensor according to claim 5, wherein said bias magnet comprises a single permanent magnet, and said magnetic resistance element is disposed between said object to be detected and said one magnetic pole side.

13. A position sensor according to claim 5, further comprising:
a circuit connected to said magnetic resistance element to convert a change in a resistance of said magnetic resistance element into a corresponding electrical signal in a pulse form.

14. A position sensor according to claim 9, wherein said bias magnet comprises a single permanent magnet, and said sensing member is disposed between said object to be detected and said one magnetic pole side.

15. A position sensor according to claim 9, further comprising:
a circuit connected to said sensing member to convert a change in a resistance of said sensing member into a corresponding electrical signal in a pulse form.

16. A position sensor as defined in claim 3, wherein the first tooth and the second tooth are spaced apart from each other in the axial direction of the body of rotation.

17. A position sensor as defined in claim 7, wherein the first ridge and the second ridge are spaced apart from each other in the radial direction of the body of rotation.

18. A position sensor as defined in claim 1, wherein the body of rotation is driven by an engine and an output signal of the magnetic resistance element is used to discriminate a cylinder number of the engine.

19. A position sensor as defined in claim 5, wherein the body of rotation is driven by an engine and an output signal of the magnetic resistance element is used to discriminate a cylinder number of the engine.

20. A position sensor according to claim 4, wherein said bias magnet comprises a single permanent magnet, and said magnetic resistance element is disposed between said object to be detected and said one magnetic pole side.

21. A position sensor according to claim 4, further comprising:
a circuit connected to said magnetic resistance element to convert a change in a resistance of said magnetic resistance element into a corresponding electrical signal in a pulse form.

22. A position sensor according to claim 8, wherein said bias magnet comprises a single permanent magnet, and said magnetic resistance element is disposed between said object to be detected and said one magnetic pole side.

23. A position sensor according to claim 8, further comprising:
a circuit connected to said magnetic resistance element to convert a change in a resistance of said magnetic resistance element into a corresponding electrical signal in a pulse form.

24. A position sensor according to claim 1, wherein the plane where the magnetic resistance element is positioned thereon extends from one magnetic pole side of said bias magnet in a direction of the magnetic field generated directly from the bias magnet.

25. A position sensor according to claim 5, wherein said magnetic resistance element is positioned on a plane which extends from one magnetic pole side of said bias magnet in the axial direction of said bias magnet.

26. A position sensor according to claim 11, wherein said circuit includes a comparator for comparing said corresponding electrical signal in said pulse form and a predetermined voltage.

27. A position sensor according to claim 13, wherein said circuit includes a comparator for comparing said corresponding electrical signal in said pulse form and a predetermined voltage.

28. A position sensor comprising:
an object to be detected made of a magnetic material, fixed to a body of rotation and disposed within a predetermined range of an angle of rotation on a plane perpendicular to an axis of the body of rotation, including a semi-circular tooth;
a bias magnetic magnetized in an axial direction thereof for generating a bias magnet field to the body of rotation in a direction perpendicular to the axis of the body of rotation; and
a magnetic resistance element disposed in the bias magnetic field generated directly from said bias magnet, at a position deviated from the position of disposing the object to be detected in an axial direction of the body of rotation and detecting a direction of a magnetic vector in the axial direction of the body of rotation, said magnetic resistance element being positioned away from one magnetic pole side of said bias magnet in a direction of said magnetic field generated directly from said bias magnet and in the axial direction of said bias magnet, whereby said magnetic resistance element is subjected to a greatest possible magnetic field.

29. A position sensor according to claim 1, wherein a component of the magnetic field in a direction of deflection thereof is perpendicular to a plane containing the object to be detected throughout an entire rotation of the body.

30. A position sensor according to claim 1, wherein the object to be detected includes a pair of teeth disposed at axially spaced positions in said axial direction of the body of rotation and wherein the magnetic resistance element is disposed axially between but radially outside the pair of teeth.

31. A position sensor according to claim 30, wherein said teeth are disposed perpendicularly to the axis of the body of rotation.

32. A position sensor according to claim 5, wherein the magnetic resistance element is disposed at a position spaced apart from the object in the axial direction of the bias magnet.

33. A position sensor according to claim 1, wherein the object to be detected includes a first tooth and a second tooth positioned in respective planes parallel to each other and with an axial spacing therebetween, with the magnetic resistance element disposed within the axial spacing of the first tooth and the second tooth to be responsive to a deflection of direction of the bias magnetic field.

34. A position sensor according to claim 33, wherein the magnetic resistance element includes a pair of magnetic resistance components connected in series and further comprising a comparing circuit connected to the magnetic resistance components to compare a signal of the magnetic resistance components at a junction between the magnetic resistance components with a reference signal.

35. A position sensor according to claim 4, wherein the object to be detected includes a first tooth and a second tooth positioned in respective planes parallel to each other and with an axial spacing therebetween, with the magnetic resistance element disposed within the axial spacing of the first tooth and the second tooth to be responsive to a deflection of direction of the bias magnetic field.

36. A position sensor according to claim 35, wherein the magnetic resistance element includes a pair of magnetic resistance components connected in series and further comprising a comparing circuit connected to the magnetic resistance components to compare a signal of the magnetic resistance components at a junction between the magnetic resistance components with a reference signal.

37. A position sensor according to claim 5, wherein the object to be detected includes a first tooth and a second tooth with a radial spacing therebetween, with the magnetic resistance element disposed within the radial spacing of the first tooth and the second tooth to be responsive to a deflection of direction of the bias magnetic field.

38. A position sensor according to claim 37, wherein the magnetic resistance element includes a pair of magnetic resistance components connected in series and further comprising a comparing circuit connected to the magnetic resistance components to compare a signal of the magnetic resistance components at a junction between the magnetic resistance components with a reference signal.

39. A position sensor according to claim 8, wherein the object to be detected includes a first tooth and a second tooth with a radial spacing therebetween, with the magnetic resistance element disposed within the radial spacing of the first tooth and the second tooth to be responsive to a deflection of direction of the bias magnetic field.

40. A position sensor according to claim 39, wherein the magnetic resistance element includes a pair of magnetic resistance components connected in series and further comprising a comparing circuit connected to the magnetic resistance components to compare a signal of the magnetic resistance components at a junction between the magnetic resistance components with a reference signal.

41. A position sensor according to claim 9, wherein the sensing member is positioned between the first and second arcuate members to be responsive to a deflection of direction of the bias magnetic field.

42. A position sensor according to claim 41, wherein the sensing member includes a pair of magnetic resistance components connected in series and further comprising a comparing circuit connected to the magnetic resistance components to compare a signal of the magnetic resistance components at a junction between the magnetic resistance components with a reference signal.

43. A position sensor according to claim 28, wherein the object to be detected includes a second semi-circular tooth, the first and second semi-circular teeth positioned in respective planes parallel to each other and with an axial spacing therebetween, with the magnetic resistance element disposed within the axial spacing of the first semi-circular tooth and the second semi-circular tooth to be responsive to a deflection of direction of the bias magnetic field.

44. A position sensor according to claim 43, wherein the magnetic resistance element includes a pair of magnetic resistance components connected in series and further comprising a comparing circuit connected to the magnetic resistance components to compare a signal of the magnetic resistance components at a junction between the magnetic resistance components with a reference signal.

* * * * *